United States Patent Office 3,487,092
Patented Dec. 30, 1969

3,487,092
ISOMERIZATION OF CYCLOHEXENE-1,2-
DICARBOXYLIC ANHYDRIDES
Chao-Shing Cheng, Williamsville, and Frederick C. Boye, Orchard Park, N.Y., assignors to Allied Chemical Corporation, New York, N.Y., a corporation of New York
No Drawing. Filed May 9, 1967, Ser. No. 637,090
Int. Cl. C07c 61/24
U.S. Cl. 260—346.3         10 Claims

ABSTRACT OF THE DISCLOSURE

Process for the isomerization of 4-cyclohexene-1,2-dicarboxylic anhydride and alkyl derivatives thereof comprising heating said anhydride at a temperature above about 100° C. in the presence of a catalytic amount of an aromatic polysulfonic acid for a time sufficient to produce a stable liquid mixture of isomers of said anhydride having a clear point below about 25° C. The liquid tetrahydrophthalic anhydride products obtained by the present process are useful as curing agents for epoxy resins and as intermediates in the preparation of phthalocyanine-type pigments.

---

This invention relates to an improved process for isomerizing 4-cyclohexene-1,2-dicarboxylic anhydride and alkyl deriavtives thereof to a stable mixture of isomeric forms, which is liquid at room temperature. (As employed herein, including the claims, the term, "4-cyclohexene-1,2-dicarboxylic anhydride," includes the cis and trans forms thereof.)

As is well known, 4-cyclohexene-1,2-dicarboxylic anhydride (4-tetrahydrophthalic anhydride) and its lower alkyl deriavtives are readily obtained by the Diels-Alder synthesis from 1,3-butadienes and malic anhydride. This invention provides an efficient method for producing the isomeric anhydrides, especially the 1-cyclohexenes isomer, from 4-cyclohexene-1,2-dicarboxylic anhydride.

The process of the present invention produces tetrahydrophthalic anhydride products which are liquid at ordinary temperatures, and therefor, easier to handle than are the solid isomers, such as 4-cyclohexene-1,2-dicarboxylic anhydride having a melting point of 103° C. In addition, the process of the present invention yields isomeric mixtures that can be distilled without change (as contrasted with cis-4-cyclohexene-1,2-dicarboxylic anhydride which undergoes changes in melting point and other properties at distillation temperature), thus making possible the preparation of products of high purity from raw materials of low purity (e.g. crude butadiene and maleic anhydride). Further, the liquid isomeric compositions produced by the present process are stable to changes in temperature below distillation temperatures, i.e. may be solidified and liquified repeatedly without formation of undesirable insoluble deposits.

It has been found that 4-cyclohexene-1,2-dicarboxylic anhydride and nuclear alkyl derivatives thereof can be isomerized via a double bond shift by a process which comprises heating the anhydride in the presence of a catalyic amount of an aromatic polysulfonic acid selected from the group consisting of aromatic disulfonic acids, aromatic trisulfonic acids and aromatic tetrasulfonic acids. Particularly suitable sulfonic acids for use in the process include aromatic hydrocarbon polysulfonic acids such as benzenedisulfonic acids, benzenetrisulfonic acids, naphthalenedisulfonic acids, naphthalenetrisulfonic acids and naphthalenetetrasulfonic acids as well as lower alkyl-, lower alkoxy-, halo- and nitro- substituted derivatives thereof. The lower alkyl and lower alkoxy substituents on the aromatic polysulfonic acids may be straight or branched chain and contain from 1 to 6 carbon atoms; the halogen substituents may be bromine or chlorine. Illustrative aromatic polysulfonic acids employable herein include the following:

m-benzenedisulfonic acid
p-benzenedisulfonic acid
4-bromo-m-benzenedisulfonic acid
5-bromo-m-benzenedisulfonic acid
4-chloro-m-benzenedisulfonic acid
toluene-2,4-disulfonic acid
toluene-2,5-disulfonic acid
toluene-2,6-disulfonic acid
4-bromotoluene-2,6-disulfonic acid
4-nitrotoluene-2,6-disulfonic acid
1,2-naphthalenedisulfonic acid and the 1,3-; 1,4-; 1,5-;
    1,6-; 1,7-; 1,8-; 2,3-; 2,6- and 2,7-isomers
6- or 7-chloro-1,3-naphthalenedisulfonic acids
2-nitro-1,4-naphthalenedisulfonic acid
2-chloro-1,5-naphthalenedisulfonic acid
3- or 7-nitro-1,5-naphthalenedisulfonic acids
3- or 8-nitro-1,6-naphthalenedisulfonic acids
4-nitro-2,6-naphthalenedisulfonic acid
4-methoxy-2,7-naphthalenedisulfonic acid
4-nitro-2,7-naphthalenedisulfonic acid
1,2,4-naphthalenetrisulfonic acid and the 1,3,5-; 1,3,6-;
    1,3,7- and 1,3,8-isomers
6-chloro-1,3,5-naphthalenetrisulfonic acid
8-nitro-1,3,5-naphthalenetrisulfonic acid
8-nitro-1,3,6-naphthalenetrisulfonic acid
1,3,5,7-naphthalenetetrasulfonic acid Especially preferred aromatic polysulfonic acids for use in the process of the present invention are m-benzene disulfonic acid and 1,3,6-naphthalenetrisulfonic acid; these aromatic polysulfonic acids are readily available and characteristically result in conversoin of 80% of the tetrahydrophthalic anhydride starting material.

The discovery of the present process was surprising inasmuch as use of aromatic monosulfonic acids, such as benzene sulfonic acid, as catalyst in the above-described isomerization reaction fails to produce an isomerized anhydride reaction product, and particularly, a liquid isomeric reaction product which is stable to changes in temperature, as are the liquid isomeric products obtained by the process of the present invention.

The temperatures used in the present invention to effect the isomerization reaction vary with the particular aromatic polysulfonic acid catalyst employed and the compound to be isomerized. In general, the temperature used is above about 100° C. although the more usual temperature range employed is between about 140° C. and about 230° C. A particularly preferred range is from about 190° C. to about 215° C. Temperatures above 230° C. at ordinary pressures are to be avoided because of the formation of colored degradation products while temperatures below about 140° C. are not recommended since the rate of isomerization is inconveniently slow at such low temperatures.

The isomerization preferably is effected by heating the anhydride in the molten state, i.e., the anhydride and catalyst are heated together at a temperature above the melting point of the anhydride. The molten mixture of anhydride and catalyst is then heated at a temperature in the desired range for a sufficient time to effect the isomerization. Alternatively, the anhydride may be heated with the catalyst in a suitable inert organic solvent, e.g., a hydrocarbon such as toluene, xylene and tetralin, or a halogenated derivative thereof such as dichlorobenzene and the like, in which the anhydride is soluble. The reaction is normally carried out at atmospheric pressure, but if desired, for example, if a relatively volatile solvent is employed, the reaction may be conducted in a closed vessel under the autogenous pressure developed at the operating temperature. If desired, the isomerization may also be carried out in an inert atmosphere, e.g., nitrogen, carbon dioxide and the like.

The amount of catalyst employed is at least about 0.1% by weight based on the weight of anhydride, and preferably between about 0.5% and 1.0% by weight, based on the weight of the anhydride reactant. An amount of catalyst in excess of 2.0%, by weight, does not appreciably improve the operating effectiveness of the process and may contribute to the production of undesirably tarry byproducts.

When 4-cyclohexene-1,2-dicarboxylic anhydride serves as reactant, the progress of the isomerization can be followed by determining the clear point of a small sample of the reaction mixture. This decreases from an initial high of above 70° C. to a low value below about 20° C. and then rises again due to the formation of a high percentage of 1-cyclohexene-1,2-dicarboxylic anhydride. Normally, the isomerization is halted, by cooling, when the reaction mixture has attained the desired clear point of below 20° C. The liquid isomeric anhydride mixture is recovered by vacuum distillation from the small amount of degradation products. The period of time required to accomplish the desired degree of isomerization is dependent on the amount of catalyst and the reaction temperature; the heating period normally is in excess of one hour and generally varies from about 4 to about 15 hours.

The isomeric mixtures produced by the process of the present invention, in general, begin to set at about −5° C. and reach a final solidification point at about −17° C. The solidified isomers are liquified by warming and, depending on the isomer content, have a clear point ranging upwards from about 10° C. The liquid anhydride isomer mixture, preferably, should have a clear point below about 20° C. As previously indicated, the process of solidification and liquification (i.e. "freeze-thaw cycle") may be repeated numerous times without the formation of insoluble deposits during cooling; hence, the liquid isomeric compositions formed by the process of the present invention are characterized by their stability to changes in temperature.

The following examples are illustrative of the invention. It is not intended, however, that the scope of the invention be limited by these specific examples.

EXAMPLE 1

A mixture of 2000 grams of 4-cyclohexene-1,2-dicarboxylic anhydride and 10 grams of m-benzene-disulfonic acid was heated at 193° to 199° C. for 14 hours. The isomerization mixture was then distilled at 3.0–3.5 mm. of Hg at 119° to 141° C. to yield 1841 grams of liquid isomeric cyclohexene-1,2-dicarboxylic anhydrides. The liquid product, solidified by cooling to about 0° C., had a clear point of 22° C.

EXAMPLE 2

The procedure of Example 1 was repeated using 200 grams of 4-cyclohexene-1,2-dicarboxylic anhydride employing as isomerization catalyst 1,3,6-naphthalene-trisulfonic acid and reducing the heating time to 12 hours. The mixture was then distilled at 3.03–3.4 mm. of Hg at 119° to 130° C. to yield 168 grams of liquid isomeric cyclohexene-1,2-dicarboxylic anhydride product having a clear point of 23° C.

EXAMPLE 3

A mixture of 800 grams of 4-cyclohexene-1,2-dicarboxylic anhydride and 8 grams of m-benzene-disulfonic acid was heated at 193° to 196° C. for 12 hours. The mixture was distilled at 2.0 mm. of Hg at 112° to 128° C. to yield 723 grams of liquid isomeric cyclohexene-1,2-dicarboxylic anhydride product which had a setting point of 17° C.

EXAMPLE 4

Four grams of m-benzene disulfonic acid and 800 grams of 4-cyclohexene-1,2-dicarboxylic anhydride were heated together at 205°±2° C. Samples (55–60 grams) of the mixture were withdrawn at regular time intervals and vacuum distilled. The clear point of the distillate was determined as well as the percentage content of the four isomeric cyclohexene-1,2-dicarboxylic anhydrides present (by gas liquid chromatography). A minimum clear point of 18° C. was obtained after 7 hours heating; further heating resulted in the formation of increased amounts of 1-cyclohexene-1,2-dicarboxylic anhydride and a rise in the clear point temperature. The percentage amounts of the various isomers present in the liquid product, resulting from a 7 hour heating period, were: 1-isomer 45.5%, 2-isomer 12.6%, 3-isomer 31.3% and 4-isomer 10.9%.

EXAMPLE 5

The procedure of Example 4 above was repeated except that the anhydride-catalyst mixture was heated at 200° C. A liquid isomeric product having a minimum clear point of 10° C. was obtained after 10 hours of heating. The percentage amounts of isomers present in this liquid product were: 1-isomer 36.2%, 2-isomer 13.9%, 3-isomer 39% and 4-isomer 11%.

EXAMPLE 6

The procedure of Example 4 above was repeated except that the anhydride-catalyst mixture was heated at 215° C. A liquid isomeric product having a minimum clear point of 18° C. was obtained after heating for 5 hours.

EXAMPLE 7

Employing 1% by weight of m-benzene disulfonic acid, based on the weight of 4-cyclohexene-1,2-dicarboxylic anhydride starting material, and heating the resultant mixture at 200° C., a liquid isomeric product having a minimum clear point of 13° C. was obtained after 4 hours of heating. The procedure of Example 4 above was employed in determining the reaction time necessary to obtain the minimum clear point.

Although the process of this invention has been specifically illustrated in the above examples with 4-cyclohexene-1,2-dicarboxylic anhydride, it should be understood that the present process may be similarly used to isomerize other alkyl and polyalkyl substituted derivatives of 4-cyclohexene-1,2-dicarboxylic anhydrides; these alkyl substituents are preferably aliphatically saturated hydrocarbon radicals containing from 1 to 6 carbon atoms and are inert in the isomerization reaction. Illustrative alkyl and polyalkyl substituted derivatives contemplated herein are the anhydrides of 4-methyl-; 3-methyl-; 3,6-dimethyl-; 4,5-diethyl-; 3-isopropyl-4-cyclohexene-1,2-dicarboxylic acid, and the like.

The liquid isomeric tetrahydrophthalic anhydride products obtained by the process of the present invention are especially suitable for use as curing agents for epoxy resins, as described in British Patent 914,463, and as intermediates for the production of phthalocyanine-type pigments by the method described in British Patent 686,395, the disclosures of which are incorporated herein by reference.

We claim:
1. A method of preparing a liquid mixture of isomeric cyclohexene-1,2-dicarboxylic anhydrides, which comprises heating a tetrahydrophthalic anhydride compound selected from the group consisting of 4-cyclohexene-1,2-dicarboxylic anhydride and a lower alkyl substituted derivative thereof containing from 1 to 6 carbon atoms in the alkyl chain in the presence of a catalytic amount of an aromatic polysulfonic acid selected from the group consisting of benzenedisulfonic acid, benzenetrisulfonic acid, naphthalenedisulfonic acid, naphthalenetrisulfonic acid, naphthalenetetrasulfonic acid and lower alkyl-, lower alkoxy-, halo-, or nitro-substituted derivative thereof at a temperature above about 100° C.

2. The method of claim 1 wherein the aromatic polysulfonic acid is a member selected from the group consisting of benzenedisulfonic acid and a lower alkyl-, lower alkoxy-, halo- or nitro-substituted derivative thereof.

3. The method of claim 1 wherein the tetrahydrophthalic anhydride compound is 4-cyclohexene-1,2-dicarboxylic anhydride.

4. The method of claim 1 wherein the tetrahydrophthalic anhydride is a lower alkyl substituted derivative of 4-cyclohexene-1,2-dicarboxylic anhydride.

5. The method of claim 3 wherein the temperature is between about 140° C. and 230° C.

6. The method of claim 5 wherein the aromatic polysulfonic acid catalyst is present in an amount of at least about 0.1%, by weight, based on the weight of 4-cyclohexene-1,2-dicarboxylic anhydride.

7. The method of claim 5 wherein the aromatic polysulfonic acid is m-benzene disulfonic acid.

8. The method of claim 5 wherein the aromatic polysulfonic acid is 1,3,6-naphthalene trisulfonic acid.

9. The method of claim 7 wherein said disulfonic acid is present in an amount between about 0.5 and 1.0%, by weight, based on the weight of 4-cyclohexene-1,2-dicarboxylic anhydride, and the temperature is between about 190° C. and 215° C.

10. The method of claim 8 wherein the trisulfonic acid is present in an amount between about 0.5 and 1.0%, by weight, based on the weight of 4-cyclohexene-1,2-dicarboxylic anhydride, and the temperature is between about 190° C. and 215° C.

References Cited

UNITED STATES PATENTS 2,959,599  11/1960  Bailey _____ 260—346.3

OTHER REFERENCES

Nachod and Schubert—Ion Exchange Technology (1956), Academic Press Inc., New York, N.Y. pp. 9–11 and 279.

ALEX MAZEL, Primary Examiner

BERNARD I. DENTZ, Assistant Examiner